United States Patent [19]

Wiehagen

[11] Patent Number: 5,119,065
[45] Date of Patent: Jun. 2, 1992

[54] VEHICLE PROTECTION SYSTEM

[76] Inventor: Fred A. Wiehagen, 103D Harper Dr., Turtle Creek, Pa. 15145

[21] Appl. No.: 641,168

[22] Filed: Jan. 14, 1991

[51] Int. Cl.$^5$ ............................................. B60R 25/10
[52] U.S. Cl. ................................... 340/428; 307/10.3; 307/10.5; 340/542; 340/543; 340/555; 340/825.31; 340/825.32; 361/173
[58] Field of Search ............... 340/426, 428, 555, 556, 340/557, 542, 543, 825.31, 825.32; 307/10.2, 10.3, 10.5, 10.4; 250/227.21, 227.22, 229; 70/278, DIG. 51, 277; 359/147; 361/171, 172, 173, 174-177

[56] References Cited

U.S. PATENT DOCUMENTS

| | | | |
|---|---|---|---|
| 2,953,689 | 9/1960 | Becker | 250/209 |
| 3,029,345 | 4/1962 | Douglas | 70/277 |
| 3,344,629 | 10/1967 | Burney | 340/542 |
| 3,347,072 | 10/1967 | Rose | 70/277 |
| 3,634,880 | 1/1972 | Hawkins | |
| 3,671,752 | 6/1972 | Bostrom | 250/227.21 |
| 3,733,862 | 5/1973 | Killmeyer | 340/542 |
| 3,846,640 | 11/1974 | Mihlhauser | 307/10 |
| 3,902,075 | 8/1975 | Oros | 307/10 |
| 3,902,342 | 9/1975 | Zucker et al. | 70/DIG. 51 |
| 4,127,018 | 11/1978 | Brand | 70/282 |
| 4,240,516 | 12/1980 | Henderson et al. | 180/289 |
| 4,274,080 | 6/1981 | Brunken | |
| 4,292,628 | 9/1981 | Sadler | 340/556 |
| 4,298,792 | 11/1981 | Granholm et al. | 307/10.5 |
| 4,347,545 | 8/1982 | Weishaupt et al. | 361/172 |
| 4,369,481 | 1/1983 | Early | 361/173 |
| 4,438,426 | 3/1984 | Adkins | |
| 4,672,225 | 6/1987 | Hanisko et al. | 307/10 |
| 4,697,171 | 9/1987 | Suh | 340/543 |
| 4,777,377 | 10/1988 | Jeter | 307/10 |
| 4,805,722 | 2/1989 | Keating et al. | 180/287 |
| 4,926,160 | 5/1990 | Hwang | 340/426 |
| 4,996,514 | 2/1991 | Sunami | 70/DIG. 51 |
| 5,043,593 | 8/1991 | Tsutsumi et al. | 70/278 |

Primary Examiner—Donnie L. Crosland
Assistant Examiner—Dov Popovici
Attorney, Agent, or Firm—Webb, Burden, Ziesenheim & Webb

[57] ABSTRACT

A vehicle anti-theft device includes a lock body carried on the vehicle and having a key receiving a slot. A pair of bore holes are spaced apart from each other in a predetermined pattern and extend through the lock body, which is transparent to a particular frequency of electromagnetic radiation. The key includes a first radiation reflective area aligned with one of the bore holes and a second non-reflective area aligned with the other bore hole. A systems controller includes a pair of radiation emitters and associated radiation detectors. A pair of fiber optic cables connect the radiation emitters and the radiation detectors to the bore holes. The systems controller generates control signals in response to radiation reflected from the key through the optic cables. If a proper pattern of radiation is reflected through the optic cables, the vehicle will be operated in a normal manner. If an improper pattern of reflective radiation is detected, an alarm system will be activated and the vehicle will be blocked from further operation.

20 Claims, 4 Drawing Sheets

VEHICLE PROTECTION SYSTEM

BACKGROUND OF THE INVENTION

1. Field Of The Invention

The present application relates to protection systems and, more particularly, to systems which prevent the unauthorized entry into or use of a motor vehicle.

2. Description Of The Prior Art

Automobile theft continues to be a serious problem in the United States and other countries. The key locks typically installed at the factory on motor vehicles are widely recognized as being little or no deterrent to even an unsophisticated criminal intent on stealing an automobile. A wide variety of systems have been developed which, allegedly, prevent or deter a thief from stealing the automobile. These range from simple alarm systems to complicated and coded entry cards. A variety of card-based, electronic or magnetic key systems for controlling the entry into or operation of a car vehicle are disclosed in the following patents known to applicant: U.S. Pat. Nos. 2,953,689; 3,634,880; 3,846,640; 3,902,075; 4,127,018; 4,240,516; 4,274,080; 4,347,545; 4,369,481; 4,438,426; 4,672,225; 4,697,171; 4,777,377; 4,805,722; and 4,926,160.

These systems have serious problems in that they are either too complicated and expensive to use or can be readily overcome by a determined thief.

It is an object of the present invention to provide a vehicle anti-theft system which is both economical and inexpensive to install, is easy to operate, and is also nearly impossible to be circumvented.

SUMMARY OF THE INVENTION

Accordingly, I have invented a vehicle anti-theft device which includes a lock body carried on the vehicle and having a key receiving slot therethrough. A pair of bore holes are spaced apart from each other in a predetermined pattern and extend through the lock body adjacent and oriented toward the slot. At least the portions of the lock body located between an inner end of each bore and the slot are formed of a material which is transparent to a particular frequency of electromagnetic radiation. The slot receives a key having a complementary cross section. The key includes a first reflective area which is aligned with one of the bore holes when the key is positioned in the slot. The key has a second area which is non-reflective of the radiation and is aligned with the other bore hole when the key is positioned in the slot. The system also includes a systems controller with a first radiation emitter and associated first radiation detector, and a similar second radiation emitter and second radiation detector. A pair of fiber optic cables connect the radiation emitters and the radiation detectors to the bore holes and carry the electromagnetic radiation between the lock and the systems controller. The systems controller is activated when the key is inserted into the slot of the lock body and generates control signals in response to radiation reflected from the key through the fiber optic cables. If a proper pattern of radiation is reflected back through the fiber optic cables, then the vehicle will be operated in a normal manner. If an improper pattern of reflective radiation is detected, then an alarm system will be activated and the vehicle will be blocked from further operation.

The lock body can be carried on the vehicle door and one control signal activates a mechanism for unlocking the door. The lock body can also be carried on the dashboard and activate a switch for supplying electrical power to the vehicle ignition system. The system can include a normally activated kill switch between the coil and the distributor and a normally activated brake lock. The kill switch and the brake lock are disabled only in response to a proper control signal generated by the systems controller. Motion sensing switches can be positioned at various locations on the vehicle to activate the alarm when the switches are closed. The vehicle can also include a mechanism for locking all the vehicle doors if an improper key is inserted in the dashboard lock.

DETAILED DESCRIPTION OF THE PREFERRED EMBODIMENT

Figure 1:
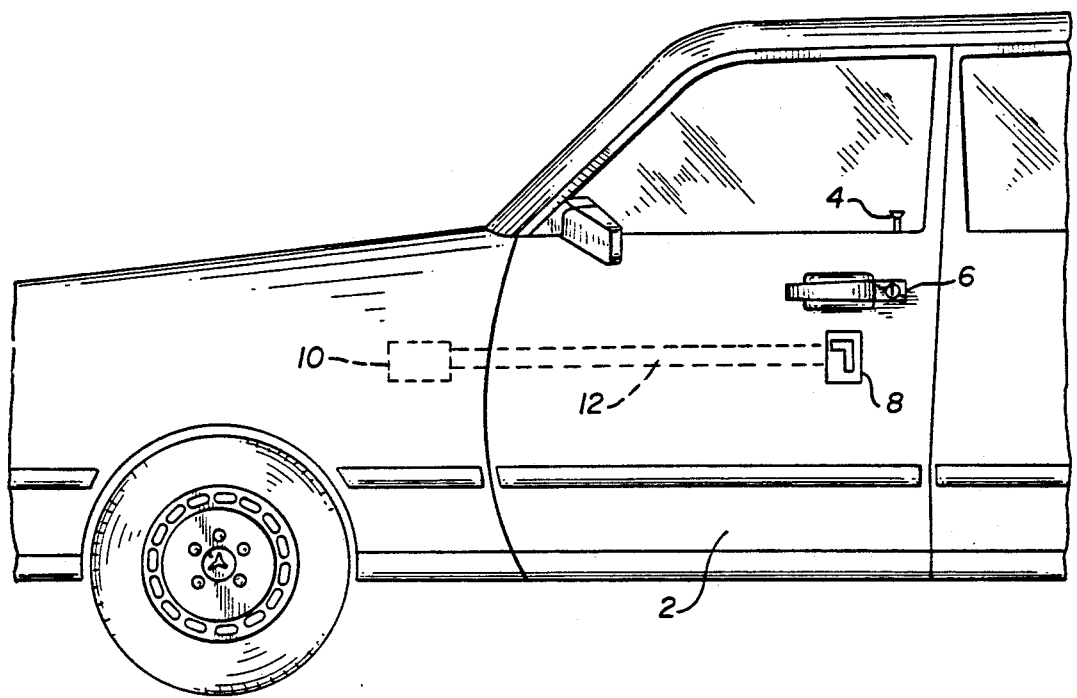
FIG. 1 is a side view of a portion of an automobile showing a door lock in accordance with the present invention.

The anti-theft system of the present invention can be used to control entry into a vehicle's doors as well as control the operation of a vehicle's ignition system. As shown in FIG. 1, a typical automobile door 2 has a latch button 4 and a handle 6 with an appropriate closing mechanism therein. A door lock 8 in accordance with the present invention is carried on the door 2, typically beneath or adjacent the handle 6. The door lock 8 and its operation will be described hereinafter in more detail in connection with FIGS. 4 and 5. This invention also uses an electronic systems controller 10 which is ideally located within the engine compartment adjacent the vehicle's fire wall. Although the systems controller 10 can be placed at other locations, adjacent the firewall is a secure location since it is separate from the door lock 8 and is also secured within the locked hood of the vehicle. A plurality of control wires 12 connect the door lock 8 to the systems controller 10 and the systems controller 10 has a plurality of control wires connecting it to various operating elements of the vehicle.

Figure 2:
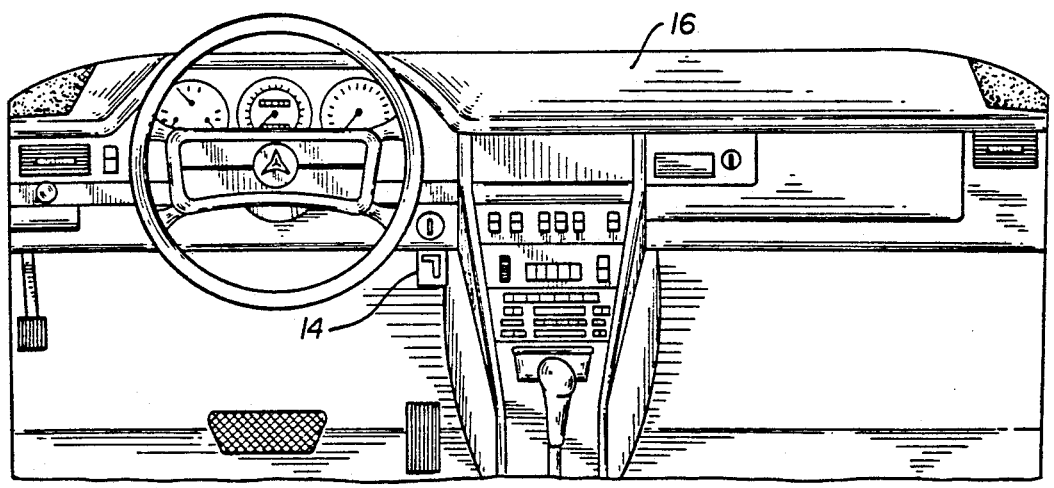
FIG. 2 is a front view of the dashboard area of an automobile showing the ignition lock in accordance with the present invention.
Figure 3:
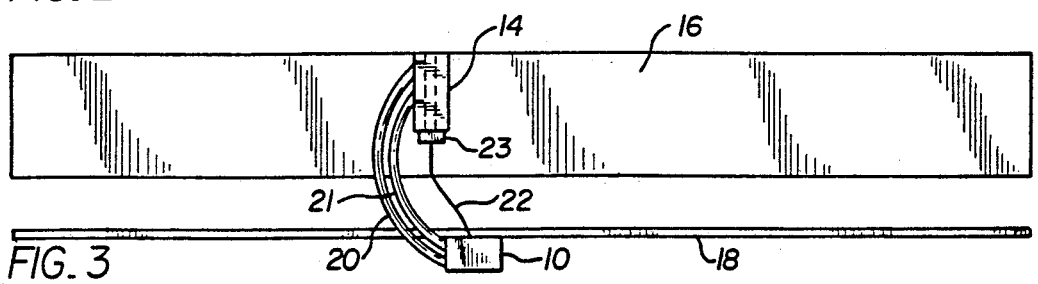
FIG. 3 is a top view of a portion of FIG. 2.

FIGS. 2 and 3 show a similar ignition lock 14 installed beneath or within the dashboard 16 of a vehicle and used to control the ignition system. An ignition lock 14 is installed, as shown in FIG. 2, beneath the dashboard 16 and is connected to the systems controller 10 located within the engine compartment and attached to the fire wall 18 as shown in FIG. 3. A pair of fiber optic cables 20, 21 extend from the ignition lock 14 to the systems controller 10 and a switch wire 22 extends from a contact switch 23 at a rear portion of the ignition lock 14 to the systems controller 10. Although separate electronic systems controllers can be provided for the door lock 8 and the ignition lock 14, it is preferable to have one consolidated, electronic systems controller 10 for both locks as is shown in FIGS. 1-3.

Figure 4:
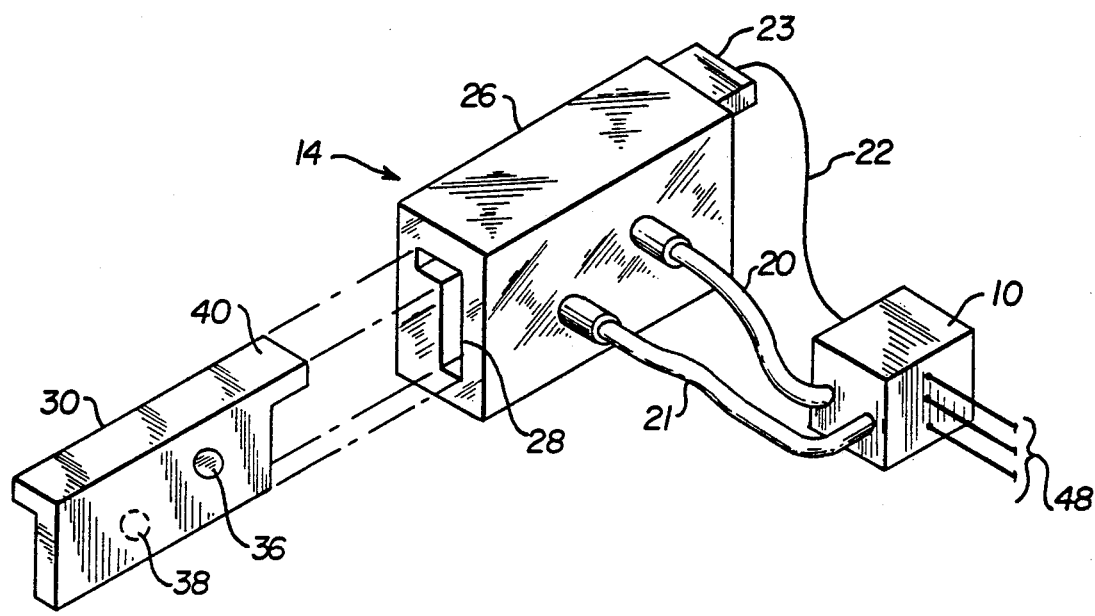
FIG. 4 is a perspective view of the lock and control elements of the present invention.
Figure 5:
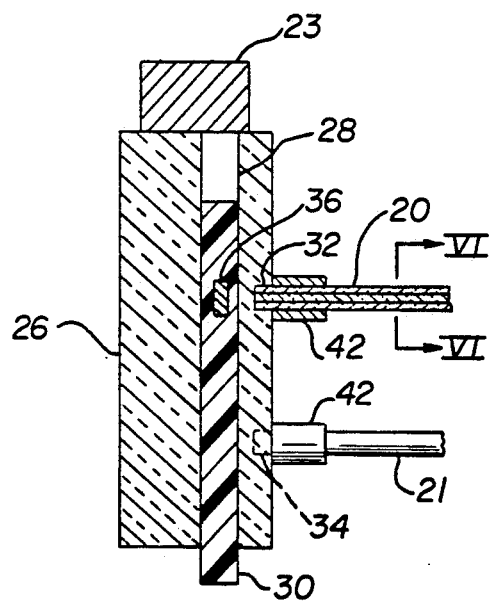
FIG. 5 is a section taken through the lock body of FIG. 4 with the key, inserted in the slot.

The ignition lock 14 and its connection to the controller 10 is shown in more detail in FIGS. 4 and 5. The door lock 8 and ignition lock 14 are similar in their construction and in their connection to the systems controller 10. Therefore, only the ignition lock 14 will be discussed in detail in connection with FIGS. 4 and 5. The ignition lock 14 includes a lock body 26 which is preferably a solid, rectangular block of material which has an elongated slot 28 extending therethrough. The slot 28 is preferably L-shaped in cross section and is adapted to receive an elongated, generally flat key 30. The key 30 and slot 28 are provided in a complementary L-shaped arrangement so that only one orientation of the key 30 is proper within the slot 28.

The lock body 26 includes a first bore hole 32 and a second bore hole 34 spaced apart from each other and extending through the lock body 26 adjacent and oriented toward the slot 28. At least a portion of the lock body 26 located between the inner end of each bore hole 32, 34 and the slot 28 is formed of a material which is transparent to a predetermined frequency of electromagnetic radiation. It is preferred that the entire lock body 26 is formed substantially of such a material which readily passes the electromagnetic radiation. The bore holes 32, 34 are spaced apart from each other and positioned in precise locations on one side of the lock body 26 in order to provide a uniquely coded arrangement for the lock 14. The key 30 includes a first area 36 which reflects the electromagnetic radiation and is positioned on the key 30 so as to be aligned with the first bore hole 32 when the key 30 is positioned in the slot 28. The key 30 also includes a second area 38 which does not reflect the electromagnetic radiation and is positioned on the key 30 so as to be aligned with the second bore hole 34 when the key 30 is positioned in the slot 28. It is not significant whether the remainder of the key 30 has reflective or non-reflective areas since these areas will not be aligned with either bore hole 32, 34 when the key 30 is properly positioned in the slot 28.

As will be explained hereinafter in more detail in FIG. 7, the electronic systems controller 10 has, for each lock, a first radiation emitter and an associated first radiation detector. The controller 10 also has for each lock a second radiation emitter and an associated second radiation detector. For the ignition lock 14 shown in FIGS. 3-5, a first fiber optic cable 20 connects the first radiation emitter and first radiation detector of the systems controller 10 to the first bore hole 32 and a second fiber optic cable 21 connects the second radiation emitter and second radiation detector of the systems controller to the second bore hole 34. The fiber optic cables 20, 21 transmit radiation both from the radiation emitters to the lock 14 and also transmit any radiation reflected from the key 30 back to the radiation detectors in the systems controller 10.

A contact switch 23 is provided on a rear portion of the lock body 26 at an interior end of the slot 28. The contact switch 23 is normally open and is closed through contact with the key 30 when the key 30 is inserted within the slot 28. The key 30 preferably has an elongated projection 40 at the top end of its rear wall which is specifically designed to securely contact and close the contact switch 23. The contact switch 23 on the lock body 26, when closed, passes electrical power through a switch wire 22 connected to the systems controller 10 and provides the necessary power for the operation of the systems controller 10. Until the key 30 is inserted into the slot 28 of the lock body 26 and closes the contact switch 23, the systems controller 10 remains off.

Figure 6:
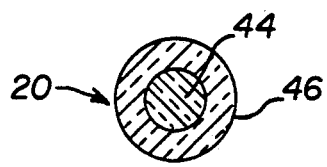
FIG. 6 is a section taken along lines VI-VI in FIG. 5.

As shown more clearly in FIG. 5, each fiber optic cable 20, 21 carries a metal connector 42 at the end adjacent the lock body 26 to securely attach the fiber optic cables 20, 21 thereto. As shown in FIG. 6, the fiber optic cables 20, 21 are each preferably a standard plastic fiber optic cable which includes a central core 44 which carries radiation from a radiation emitter and the systems controller 10 and an outer sheath 46 surrounding the core 44 and carrying reflected radiation from the lock body 26 to a radiation detector.

Referring once again to FIG. 5, it is seen that the first reflective area 36 on the key 30 is preferably formed of a reflective material which is embedded within the key 30. The key 30 can also be formed of a laminated structure which surrounds the reflective area 36. In addition, a laminated key 30 may be formed of a material which is visibly opaque, yet permits the particular electromagnetic radiation to pass therethrough to the reflective area 36.

When a proper key 30 is inserted into the slot 28 of the lock body 26, the reflective area 36 is aligned with the first bore hole 32 and the first fiber optic cable 20, and the non-reflective area 38 is aligned with the second bore hole 34 and second fiber optic cable 21. The contact switch 23 is closed by contact with the projection 40 on the key 30 and activates the systems controller 10. The controller 10 will, by operation of the radiation emitters, send electromagnetic radiation of a particular frequency through the core 44 of each fiber optic cable 20, 21. If the proper key 30 is inserted, then the radiation traveling through the first optic cable 20 will be reflected back from the reflective area 36 on the key 30 and will travel through the outer sheath 46 of the first fiber optic cable 20 to the systems controller 10. The systems controller 10 will detect this reflected radiation and generate a first control signal which will operate a particular desired operation of the vehicle. For example, if the lock 8 is used on the door 2, then this first control signal will activate some mechanism for unlocking the door 2. If the lock 14 is used on the dashboard 16 of the vehicle, then the first control signal will activate a switch which supplies electrical power to the vehicle ignition system. For a proper key 30, there should be no electromagnetic radiation reflected back from the second or non-reflective area 38 to the second fiber optic cable 21. If any electromagnetic radiation is reflected back from this second area 38, this indicates that an improper key has been used. The systems controller 10 will then generate a second control signal which not only blocks the operation or generation of the first control signal, but also activates a vehicle alarm. The wires carrying the control signals from the systems controller 10 to various areas on the vehicle are shown generally by reference number 48 in FIG. 4.

Figure 7:
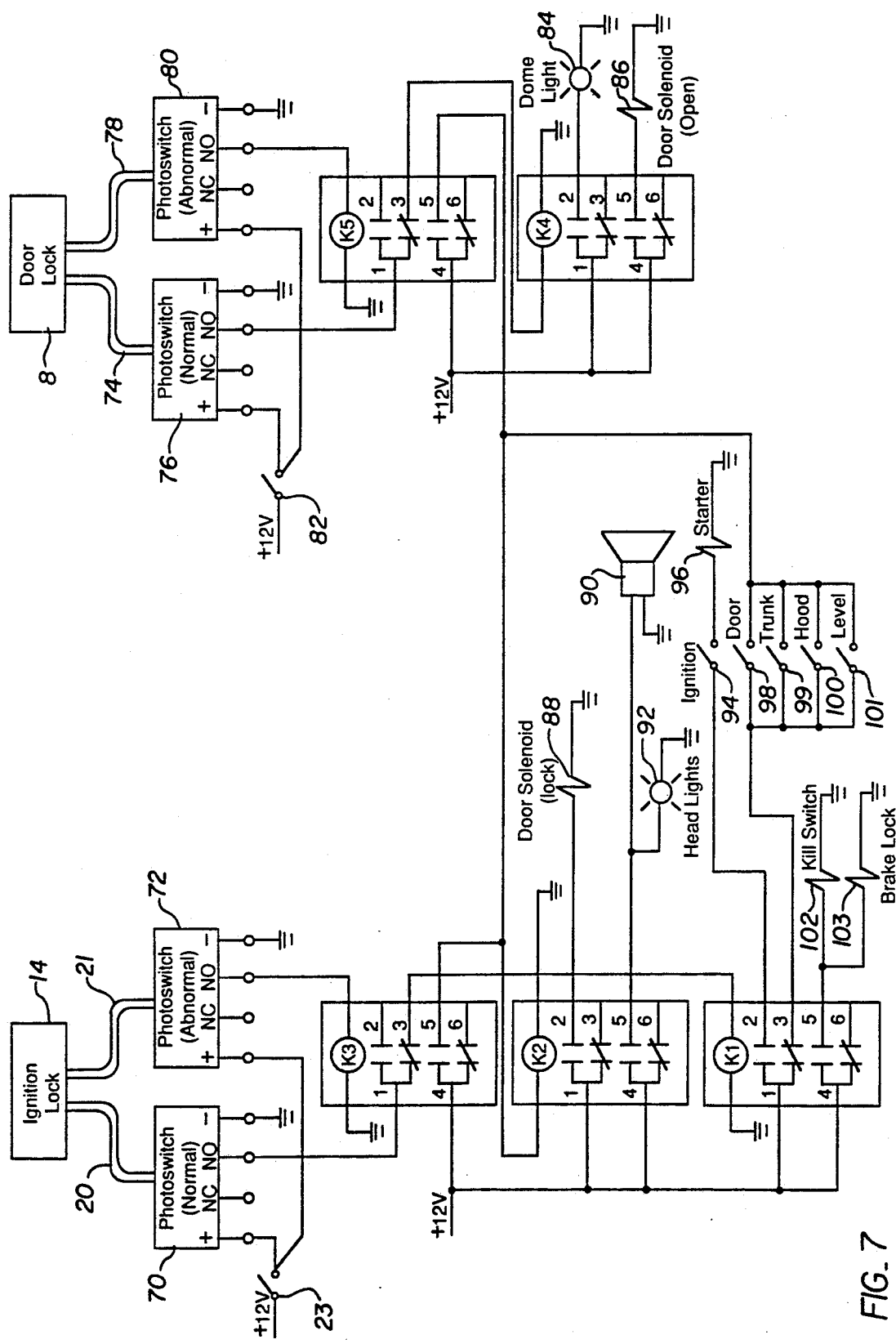
FIG. 7 is a schematic view of the control circuit used in the present invention.

A circuit diagram of a preferred embodiment of a vehicle anti-theft system of the present invention which includes both an ignition lock 14 and a door lock 8 is shown in FIG. 7. The device in this circuit which includes the radiation emitting means and associated radiation detection means for each lock is referred to as a photoswitch. A photoswitch is generally a DC fiber optic controller which both generates, through an infrared light emitting diode, a source of electromagnetic radiation and also receives back any reflected electromagnetic radiation and generates an appropriate control signal.

Figure 8:
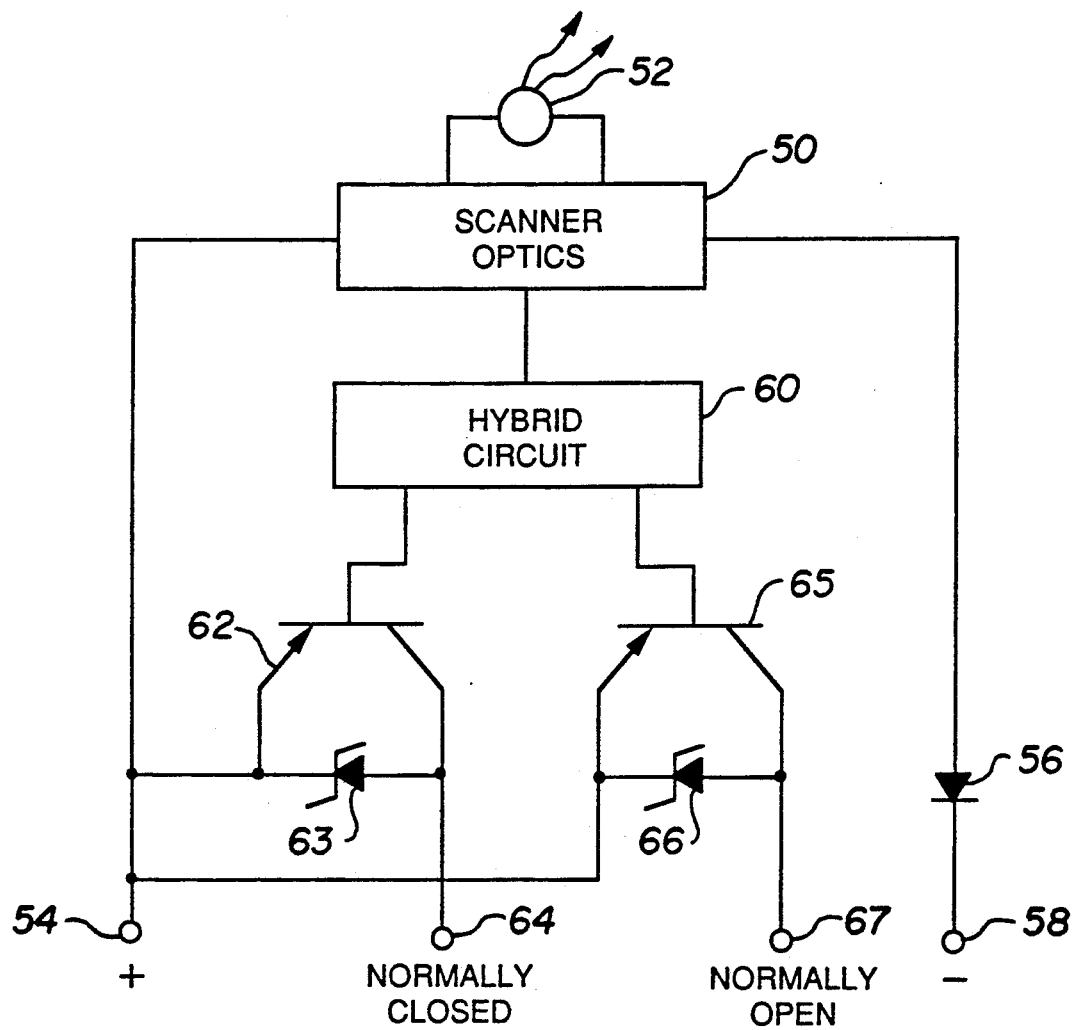
FIG. 8 is a circuit diagram of the photoswitch shown in FIG. 7.

A fiber optic controller which applicant has found to be particularly useful in the present invention is a type 42SMF-7100 Ultra-Mini, low voltage DC LED beam fiber optic controller. The circuit diagram of this fiber optic controller, supplied by the Allen-Bradley Company, is shown in FIG. 8. This fiber optic controller includes a scanner optics section 50 which generates the desired electromagnetic radiation through an infrared light emitting diode 52 and functions as the radiation emitter in the electronic systems controller 10. Power is supplied to the scanner optics 50 through a positive terminal 54 and the scanner optics 50 is grounded through diode 56 to a negative terminal 58. A hybrid circuit 60 is connected to the scanner optics 50, detects any radiation which is received back through a fiber optic cable connected to the fiber optic controller and functions as the radiation detector in the electronic systems controller 10. The hybrid circuit 60 generates an appropriate control signal (the control signals in the electronic systems controller 10) through pnp transistor 62 and zener diode 63 to a normally closed terminal 64 or through pnp transistor 65 and zener diode 66 to a normally open terminal 67.

Referring once again to FIG. 7, it is seen that four photoswitches are used in the circuit. The ignition lock 14 is connected by means of fiber optic cable 20 to a normal photoswitch 70 and by means of fiber optic cable 21 to an abnormal photoswitch 72. Similarly, the door lock 8 is connected by means of fiber optic cable 74 to normal photoswitch 76 and by means of fiber optic cable 78 to abnormal photoswitch 80. The positive terminals of the photoswitches 70, 72 for the ignition lock 14 are connected via contact switch 23 to a 12 volt power source, such as the vehicle's battery. Similarly, the positive terminals of the photoswitches 76, 80 for the door lock 8 are connected through contact switch 82 to the 12 volt power source. The negative terminals of the photoswitches 70, 72, 76 and 80 are grounded. As discussed above, the contact switches 23, 82 are each located at the rear end of the lock body and are closed when the key is properly inserted into the slot.

The circuit includes five double pole, double throw relays which are connected to the photoswitches, to the 12 volt power source and to various controlled elements on the motor vehicle. These relays are identified by reference numbers K1, K2, K3, K4 and K5. Other than the ignition locks 8, 14, the fiber optic cables 20, 21, 74 and 78, the contact switches 23, 82, the 12 volt power source, and the controlled elements on the vehicle, the remainder of the elements shown in FIG. 7 constitute the electronic systems controller 10.

Referring firstly to the door lock 8, the normally open output of normal photoswitch 76 is connected to input terminal 1 of relay K5. Normally closed output terminal 3 of relay K5 is connected to the coil of relay K4. The normally open contact of abnormal photoswitch 80 is connected to the coil of relay K5. Input terminal 4 of relay K5 is connected to the 12 volt power source and normally open output terminal 5 of relay K5 is connected to the coil of relay K2, which will be described hereinafter in more detail. Both input terminals 1 and 4 of relay K4 are connected to the 12 volt power source. Normally open output terminal 2 of relay K4 is connected to a dome light 84 in the interior of the vehicle. Normally open terminal 5 of relay K4 is connected to a solenoid 86 which unlatches the locked door of the motor vehicle.

Turning now to the ignition lock 14 portion of the circuit of FIG. 7, the normally open terminal of normal photoswitch 70 is connected to input terminal 1 of relay K3. The normally open terminal of abnormal photoswitch 72 is connected to the coil of relay K3. Input terminal 4 of relay K3 is connected to the 12 volt power source. Normally closed output terminal 3 of relay K3 is connected to the coil of relay K1. Normally open output terminal 5 of relay K3 is connected to the coil of relay K2. Each of the input terminals 1 and 4 of relays K2 and K1 are 12 volt power source. Normally open output terminal 2 of relay K2 is connected to a door locking solenoid 88. Normally open output terminal 5 of relay K2 is connected both to a siren 90 and to a flasher 92 which will turn the vehicle headlights on and off.

Normally open output terminal 2 of relay K1 is connected through an ignition switch 94 to the vehicle's starter 96. Normally closed output terminal 3 of relay K1 is connected through a parallel circuit of motion sensing switches to the coil of relay K2. As shown in FIG. 7, there is a parallel series of motion sensing switches 98, 99 and 100, which are attached to the vehicle's doors, trunk and hood, respectively, and will close if the doors, trunk and/or hood are opened. In addition, a level sensing switch 101 is connected in this parallel circuit and will close if the car is tilted by more than a certain angle away from level. Finally, normally, open output terminal 5 of relay K1 is connected to a kill switch 102 and to a brake locking solenoid 103.

The circuit operates as follows. When the car is in a normal, parked mode, the motion sensing switches 98-100 and level sensing switch 101 are activated by normally closed contacts 1-3 of relay K1. If any of switches 98-101 are closed, then power will flow from the 12 volt source to the coil in relay K2. When relay K2 is activated, normally open contacts 1-2 will close, activating the door solenoid 88 which locks the doors of the vehicle if they are not already locked. Activation of relay K2 also closes normally open contacts 4-5, which will operate the siren 90 and activate flasher 92 to flash the headlights of the vehicle.

In order to open the door, the key is inserted into the slot of the door lock 8. The contact switch 82 at the rear of the door lock 8 will be closed and will supply power to the positive input terminal of both normal photoswitch 76 and abnormal photoswitch 80. The photoswitches 76, 80 will generate an infrared beam of radiation which will be transmitted through the fiber optic cables 74, 78 to the door lock 8. If a properly encoded key is positioned in the door lock 8, then radiation will be reflected through fiber optic cable 74 to normal photoswitch 76 and no radiation will be reflected back through fiber optic cable 78 to abnormal photoswitch 80. If the proper key is used, then a control signal will be generated at the normally open terminal of normal photoswitch 76 which will be supplied across the normally closed terminals 1-3 of relay K5 and activate the coil of relay K4. This activation will close normally open terminals 4-5 of relay K4 and allow power to pass from the 12 volt source to the door opening solenoid 86. In addition, if desired, power will simultaneously be passed through the now open terminals 1-2 of relay K4 and power the dome light 84 within the vehicle. The vehicle can then be opened normally since the correct key has been used.

If the wrong key is inserted in the door lock 8, either no radiation will be reflected back to normal photoswitch 76, which will not activate the coil on relay K4, or if the key has a reflective area in the second area, which should have no reflective area, then radiation will be reflected back through fiber optic cable 78 to abnormal photoswitch 80. At that point, a signal will be generated at the normally open contact of abnormal photoswitch 80 and directly energize the coil of relay K5. This will open normally closed terminals 1-3 of relay K5 and ensure that no matter what signals are generated by normal photoswitch 76, no signal will be supplied to energize the coil of relay K4. In addition, normally open terminals 4-5 of relay K5 will be closed and connect the 12 volt supply to the coil of relay K2. This will activate the siren 90, headlight flasher 92 and door lock solenoid 88 as discussed above.

Once an operator has properly used the key to open the door lock 8, the operator enters the vehicle and places the key in the slot of the ignition lock 14. The key will close the contact switch 23 of the ignition lock 14, supplying 12 volt power to the positive input terminals of normal photoswitch 70 and abnormal photoswitch 72. As with the door lock 8, both photoswitches 70, 72 will generate infrared radiation from the light emitting diodes and the fiber optic cables 20, 21 will transmit this radiation to the ignition lock 14. If a proper key is used, then radiation will be reflected back through fiber optic cable 20 to normal photoswitch 70 and will generate a control signal at its normally open terminal. A control signal will then be supplied across normally closed terminals 1-3 of relay K3 to the coil of relay K1. By activating the coil of relay K1, normally open terminals 1-2 of relay K1 are closed, which connects the 12 volt source to the ignition system of the vehicle. Thus, the vehicle can be started in a normal manner by closing the ignition switch 94 which activates the starter 96. At the same time, normally open terminals 4-5 of relay K1 are closed, which supplies the 12 volt source to disable both the kill switch 102 and the brake lock solenoid 103. These latter features are optional to the system but are an additional theft prevention measure. The kill switch 102 is positioned between the coil and the distributor of the vehicle and, unless disabled, prevents the vehicle from being started even if a thief connects a battery to the ignition system and bypasses the present invention. Similarly, the brake lock solenoid 103 further ensures that the vehicle cannot be moved, even if it is somehow started, unless relay K1 is properly activated.

If an improper key is inserted into the ignition lock 14, then either no light is reflected back through fiber optic cable 20 to normal photoswitch 70, which will not activate the coil in relay K1, or radiation is reflected from the wrong area of the key through fiber optic cable 21 connected to abnormal photoswitch 72. If the latter occurs, a control signal is generated at the normally open contact of abnormal photoswitch 72. This signal will activate the coil on relay K3 and both disable normal photoswitch 70 by opening contacts 1-3 of relay K3, but will also close normally open terminals 4-5 of relay K3 to supply a 12 volt signal to activate the coil on relay K2. As discussed hereinabove in more detail, activation of relay K2 both activates the door lock solenoid 88, but also activates the siren 90 and headlight flasher 92. By having an arrangement, as activated by the ignition lock system, which locks the car doors, it is possible to entrap the would-be thief in the motor vehicle.

It can be seen that the door lock 8 and ignition lock 14 can be activated only when an operator has the precise encoded information on the key as dictated by the positioning of the fiber optic cables on the side of the lock body. If a thief were to insert a key which was entirely made of a reflective material, then this would activate the abnormal photoswitch of the systems controller 10 and activate the alarm system. Not only is it required that radiation be reflected back to the normal photoswitch, it is also required that no radiation be reflected back to the abnormal photoswitch. Only a key which has a reflective material in the precise location required by the lock and also has no reflective material in the other location, will activate the system.

It is also an advantage to have the body of the lock made of a material which is translucent to the particular radiation being used. In this manner, the fiber optic cables can be positioned within the body of the lock but the bore holes need not extend completely through the lock body. In this manner, a thief cannot determine the proper positions of the bore holes by merely contacting the inside of the slot, which remains uniformly smooth throughout its entire surface. By using fiber optic cables in the system, it is impossible to tap into the system as can be done with other electrical arrangements. In addition, the only other way that the lock system can be duplicated is to know exactly the positioning of the bore holes in the lock body and to know which bore hole is connected to the normal photoswitch and which bore hole is connected to the abnormal photoswitch. Thus, the system is virtually tamperproof.

Having described above the presently preferred embodiments of the present invention, it is to be understood that it may be otherwise embodied within the scope of the appended claims.

I claim:
1. A vehicle anti-theft device comprising:
a lock body carried on said vehicle and having a key receiving slot extending therethrough and having a first bore hole and a second bore hole spaced apart from each other in a predetermined pattern and extending through the lock body adjacent and oriented toward the slot, with at least the portions of the lock body located between an inner end of each bore hole and the slot being formed of a material which is transparent to a predetermined frequency of electromagnetic radiation;
a key receivable in the slot of the lock body and having a cross section complementary with said slot, with the key further including a first area which reflects said electromagnetic radiation and which is aligned with a first of said bore holes when the key is positioned in the slot, and having a second area which does not reflect said electromagnetic radiation and which is aligned with a second of said bore holes when the key is positioned in the slot;
a systems controller having a first radiation emitting means and associated first radiation detecting means and having a second radiation emitting means and associated second radiation detecting means;
a first fiber optic cable connecting the first radiation emitting means and first radiation detecting means to the first bore hole, and a second fiber optic cable connecting the second radiation emitting means and second radiation detecting means to the second bore hole, with said fiber optic cables each adapted to transmit radiation from a radiation emitting means to the lock body and to transmit any radiation reflected from the key to a radiation detecting means; and means for activating the controller when the key is fully inserted into the slot of the lock body;

with said systems controller including a first signal means for generating a first control signal in response to radiation reflected from the key through the first fiber optic cable to the first radiation detecting means, with the first control signal activating a desired operation in said vehicle, and with said systems controller including a second signal means for generating a second control signal in response to radiation reflected from the key through the second fiber optic cable to the second radiation detecting means, with the second control signal blocking operation of the first control signal and activating a vehicle alarm.

2. The vehicle anti-theft device of claim 1 wherein said lock body is carried on a vehicle door and the first control signal activates a means for unlocking the vehicle door.

3. The vehicle anti-theft device of claim 1 wherein the first control signal activates a solenoid for unlocking the vehicle door and also activates a dome light within the vehicle.

4. The vehicle anti-theft device of claim 1 wherein said lock body is carried on a dashboard of the vehicle and the first control signal activates a switch means for supplying electrical power to an ignition system in the vehicle.

5. The vehicle anti-theft device of claim 4 further including a normally activated kill switch positioned electrically between a coil and a distributor in the vehicle, with the kill switch disabled in response to the first control signal.

6. The vehicle anti-theft device of claim 4 further including a normally activated brake lock which is disabled in response to the first control signal.

7. The vehicle anti-theft device of claim 4 further including motion sensing switches on all doors, on a hood, and on a trunk of the vehicle, and including a level sensing switch or the vehicle, with the closing of said motion sensing switches on said level sensing switch activating said alarm.

8. The vehicle anti-theft device of claim 4 further including means for locking all doors on the vehicle in response to the second control signal.

9. The vehicle anti-theft device of claim 1 wherein said vehicle alarm includes a siren and a means for flashing lights on the vehicle.

10. The vehicle anti-theft device of claim 1 including a first lock body carried on a vehicle door and an associated first systems controller and fiber optic cables connecting the first systems controller and the first lock body, and including a second lock body carried on a dashboard of the vehicle and an associated second systems controller and fiber optic cables connecting the second systems controller and the second lock body, with the first control signal of the first systems controller activating a means for unlocking the vehicle door and with the first control signal of the second systems controller activating a switch means for supplying electrical power to an ignition system in the vehicle.

11. The vehicle anti-theft device of claim 10 wherein said first and second systems controllers are located in an engine compartment of the vehicle.

12. The vehicle anti-theft device of claim 1 wherein said systems controller is located in an engine compartment of the vehicle.

13. The vehicle anti-theft device of claim 1 wherein the lock body is formed substantially of a material which readily transmits said electromagnetic radiation.

14. The vehicle anti-theft device of claim 13 wherein said bore holes extend into said lock body toward, but stop short of, said slot.

15. The vehicle anti-theft device of claim wherein the reflective area on the key is covered by a layer of material which is opaque yet permits said predetermined frequency of electromagnetic radiation to pass therethrough.

16. The vehicle anti-theft device of claim 1 wherein said radiation emitting means are light emitting diodes operating in an infrared range.

17. The vehicle anti-theft device of claim 1 wherein the means for activating the controller is a contact switch at an interior end of the slot, with said contact switch closed through contact by the key inserted within the slot.

18. The vehicle anti-theft device of claim 17 wherein the key has a rearward projection which is adapted to engage and close the contact switch.

19. The vehicle anti-theft device of claim 1 wherein the slot and key are each L-shaped in cross section.

20. The vehicle anti-theft device of claim 1 wherein each fiber optic cable includes a central core which transmits radiation from the radiation emitting means to the lock body and an outer sheath surrounding the core which transmits reflected radiation from the lock body to the radiation detecting means.

* * * * *

UNITED STATES PATENT AND TRADEMARK OFFICE
CERTIFICATE OF CORRECTION

PATENT NO. : 5,119,065

DATED : June 2, 1992

INVENTOR(S): Fred A. Wiehagen

It is certified that error appears in the above-identified patent and that said Letters Patent is hereby corrected as shown below:

Column 2 Line 26 after "key" delete --,--.

Column 6 Line 13 after "are" insert --connected to the--.

Column 6 Line 65 change "open" to --closed--.

Claim 1 Line 43 Column 8 after "at least" delete --the--.

Claim 7 Line 47 Column 9 "or" should read --on--.

Claim 7 Line 47 Column 9 after "with" delete --the--.

Claim 7 Line 48 Column 9 "on" should read --or--.

Claim 15 Line 29 Column 10 after "claim" insert --1--.

Signed and Sealed this

Thirty-first Day of August, 1993

Attest:

BRUCE LEHMAN

*Attesting Officer*     *Commissioner of Patents and Trademarks*